United States Patent [19]

Specht et al.

[11] E Re. 30,238

[45] Reissued Mar. 25, 1980

[54] ADDITIVES TO IMPROVE THE FLOW OF HEAVY FUELS AND CRUDE OILS

[75] Inventors: Edward H. Specht, Huntingdon Valley; James H. O'Mara, Warminster, both of Pa.

[73] Assignee: Rohm and Haas Company, Philadelphia, Pa.

[21] Appl. No.: 945,940

[22] Filed: Sep. 25, 1978

Related U.S. Patent Documents

Reissue of:

[64] Patent No.: 4,000,986
Issued: Jan. 4, 1977
Appl. No.: 541,176
Filed: Jan. 15, 1975

[51] Int. Cl.[2] ..... C10L 1/22

[52] U.S. Cl. ..... 44/62; 44/66

[58] Field of Search ..... 44/62, 66; 260/88.1 PC, 260/86.1 R, 78.5 T, 80.8, 94.9 GB; 526/312

[56] References Cited

U.S. PATENT DOCUMENTS 3,687,849 8/1972 Abbott ..... 252/51.5

FOREIGN PATENT DOCUMENTS 884976 12/1920 United Kingdom .

*Primary Examiner*—Delbert E. Gantz
*Assistant Examiner*—Y. Harris-Smith

[57] ABSTRACT

Long-chain, amide-containing esters of carboxylic acid-containing polymers as flow improvers in hydrocarbon oils are disclosed and claimed. These fluidity improvers are useful in hydrocarbon oils, such as crude oils, residual fuel oils and middle distillate fuels. The novel materials of the present invention are also useful as pour point depressants in various hydrocarbon oils, for example, in crude oils, residual fuel oils and middle distillate fuels.

8 Claims, No Drawings

ADDITIVES TO IMPROVE THE FLOW OF HEAVY FUELS AND CRUDE OILS

Matter enclosed in heavy brackets [ ] appears in the original patent but forms no part of this reissue specification; matter printed in italics indicates the additions made by reissue.

This invention is concerned with the preparation and use of materials which, when added in very small amounts to certain petroleum oils, improve the flow characteristics. Petroleum oils contain varying amounts of wax, largely long-chain paraffinic hydrocarbons. In untreated oils, as the temperature is lowered, the wax crystallizes in flat plates which form an interlocking network, trapping the remaining liquid oil and preventing its flow. The temperature, which is 5° F. higher than that at which oil ceases to flow when chilled under controlled conditions (ASTM D-97), defined as the pour point.

The pour point characteristics of oils are important considerations in the design and operation of facilities for oil storage and handling. Oils with high pour points, e.g., crude oils with pour points above about 50°-60° F., residual fuel oils with pour points in the 80°-120° F. range and middle distillate fuels with pour points above about 10°-30° F., present serious problems in pumping and storage. Thus, there is a need for additives which, by interfering with the wax crystallization pattern, change the crystal structure to such an extent that pour points are lowered and pumpability or fluidity is extended to much lower temperatures.

The use of ester polymers with long alkyl groups as fluidity improvers in petroleum oils is recognized. We have discovered that inclusion of an amide group in the hydrocarbon chain provides significantly enhanced activity, thus making possible lower treatment levels in many oils and resulting in the successful treatment of oils for which currently available additives are inadequate.

We have discovered that the use of long-chain, amide-containing esters of carboxylic acid-containing polymers enhances these materials as flow improvers in hydrocarbon oils (crude oils, residual fuel oils, middle distillate fuels) and also decreases the pour point.

The materials useful for this invention are generally described as N-acylaminoethyl esters of carboxylic acid-containing polymers:

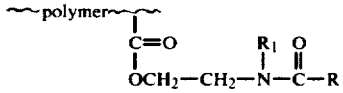

and where R is an alkyl or alkene group having about 11 to 29 carbon atoms, and where $R_1$ is H or an alkyl group having 1 to 4 carbon atoms.

Specific polymers types which are included are: [as follows:]

[1. Acrylate and/or methacrylate polymers and copolymers.]

[2. Copolymers]

*1. Copolymers* of olefins with acrylates, methacrylates, fumarates, itaconates and maleates.

The olefins may be simple, unsubstituted olefins, such as ethylene, propylene, butylenes diisobutylenes and the higher α-olefins, $C_6$-$C_{30}$; or substituted olefinic materials, such as styrene and vinyl esters with 2-30 carbons in the acid component.

*2.* Amide esters of oxidized forms of olefin polymers and copolymers. Specifically, oxidized polyethylene (Acid No. 15) has been esterified with amide-alcohols to obtain amide-ester products which show flow improving activity in residual fuel oils comparable to that exhibited by the amide-esters of ethylene/acrylic acid copolymers [and of cetyl-eicosyl acrylate/acrylic acid copolymers].

These polymers and copolymers may have molecular weights in the range of 500 to 100,000, preferably in the range of 2000 to 50,000.

The amide group-containing alcohol used to obtain amide group-containing esters in the above polymers may be represented as:

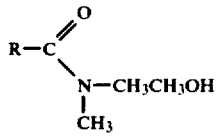

in which the acid, R-COOH, from which the above hydroxyethylamide is derived has from 12-30 carbon atoms, preferably straight-chain and saturated; mixtures of such acids may also be used. R, therefore, is preferably a straight-chain and saturated alkyl group of about 11-29 carbon atoms. These amide-alcohols may be prepared by heating a fatty acid with an equivalent amount of 2-(N-methylamino) ethanol or with the amino alcohol in excess:

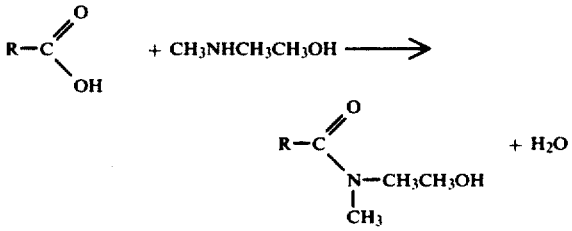

If excess amino alcohol is used, the unreacted amino alcohol remaining may be recovered by vacuum distillation and the amide-alcohol product used as a vacuum stripped residue. Alternatively, the amide-alcohol product may be recrystallized from a suitable solvent.

The amide-alcohols may also be prepared by aminolysis of a lower alkyl ester of the fatty acid:

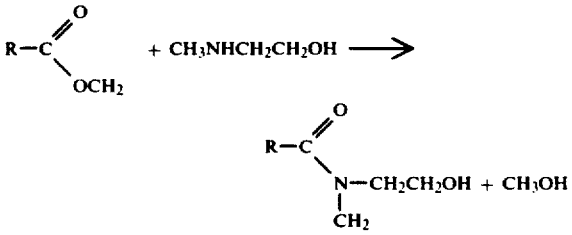

Incorporation of these amide-alcohols into the amide-ester-containing polymers and copolymers of this invention may be carried out as follows:

1. Preparation of amide-ester monomers followed by polymerization or copolymerization.

The monomers may be prepared by direct esterification of monomeric acids:

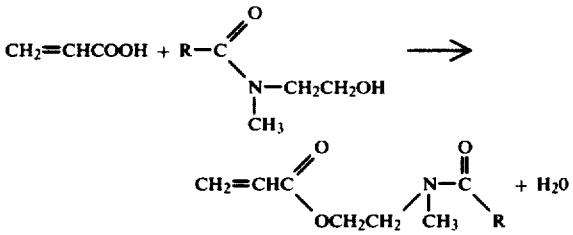

or by transesterification of lower alkyl esters of the monomeric acids with the amide-alcohols:

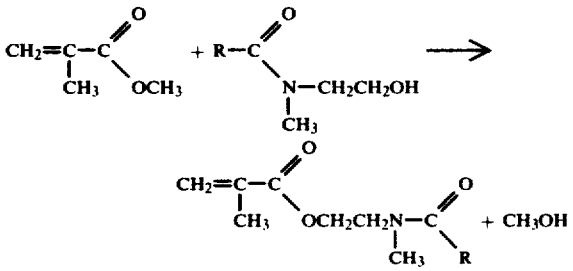

2. Preparation of carboxylic acid (or anhydride) containing copolymers followed by direct esterification of the acid groups with the amide-alcohols:

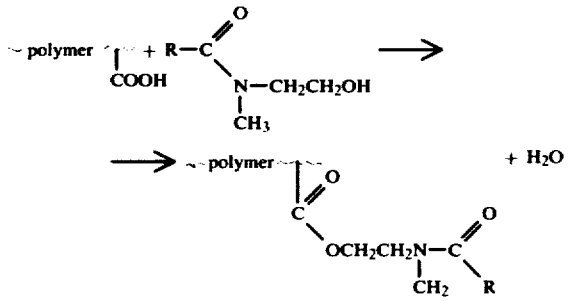

3. Preparation of copolymers containing ester groups, preferably lower alkyl esters such as methyl or ethyl, followed by transesterification with the amide-alcohols:

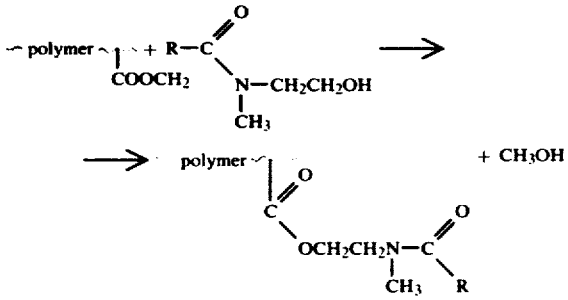

The prior art has taught the use of long-chain alkyl groups in the polymers used as flow improvers. These alkyl groups may be side chains from the backbone of polymers and copolymers made from long-chain α-olefins. They may also be present as alkyl ester groups in ester polymers and copolymers made from acrylates, methacrylates, itaconates, maleates, fumarates and the like. Desirable chain lengths are in the range of 18-30 carbons, with 20-24 being preferred.

Residual fuel oils vary widely in composition, in terms of sulfur content, wax content and asphaltenes content, all of which have an effect on the pour point. Considerable variation is observed also in the response of oils to the use of flow improving additives. An additive which obtains a good response in some oils may be relatively poor in others. No single additive will necessarily give the best performance in all oils. This has been found to be true both in the currently available commercial additives and in the additives of this invention. However, the additives of this invention, in which an amide group is included in the alkyl chain, show greater activity in many oils and, thus, can often be used in significantly lower concentrations, by comparison with typical commercial additives; see Table I.

Flow improving additives are commonly recommended for use at concentrations in the range of 0.005-1.0% by weight, sometimes over an even wider range. In practice, however, usages are most often in the range of 0.05-0.3%. As the concentration is raised from a very low value, the amount of pour point depression increases but levels out as the optimum concentration is reached; it may even decrease slightly with further increases in concentration. This effect is shown in Table II, with one of the additives of this invention in a typical No. 6 residual fuel oil. Here the optimum response has been reached at 0.1%, and doubling the concentration shows no additional activity.

Most of the currently available commercial additives used as flow improvers in petroleum oils are polymers and copolymers of ester monomers. The long straight-chain alkyl groups, which are essential for pour point activity, are present as alkyl esters. These alkyl groups are mostly in the range of 18-30 carbons, with 20-24 being preferred.

TABLE I

| | | Pour Points, °F. (ASTM D-97) | | | | | |
|---|---|---|---|---|---|---|---|
| | | Residual Oils (No. 6) | | | | | Crude Oil |
| Additive | % | a | b | c | d | e | f |
| None | 0 | 90 | 80 | 90 | 85 | 105 | 110 |
| | Commercial Additives[1] | | | | | | |
| A | 0.17 | 70 | 110 | 60 | 65 | 35 | 80 |
| B | 0.2 | 55 | 60 | 70 | 70 | 75 | — |
| C | 0.2 | 70 | 45 | 75 | 70 | 80 | 85 |
| D | 0.16 | 70 | 45 | 75 | 70 | 85 | 85 |
| | Applicants' Additives[2] | | | | | | |
| 1 | 0.1 | 40 | 40 | 40 | 45 | 75 | 55 |
| 2 | 0.1 | 65 | 45 | 65 | 55 | 70 | |
| [3 | 0.1 | 50 | 55 | 80 | 80 | 50 | —] |
| 4 | 0.2 | 80 | — | 70 | 60 | — | |
| 3[5] | 0.2 | 80 | 55 | 60 | 55 | 50 | — |

[1]A - $C_{12}$ ester of an ethylene)maleic anhydride copolymer
B - Vinyl acetate/$C_{22}$ alkyl fumarate copolymer
C - $C_{22}$ acrylate polymer
D - $C_{22}$ acrylate polymer
[2]1 - $C_{22}$-$C_{22}$ amide-ester of ethylene/acrylic acid copolymer
2 - $C_{22}$-$C_{22}$ amide ester of ethylene/acrylic acid copolymer
[3 - $C_{20}$-$C_{22}$ amide ester of cetyl-cicosyl acrylate/acrylic acid copolymer
4 - $C_{20}$-$C_{22}$ amide-ester of cetyl-cicosyl methacrylate/acrylic acid copolymer]
[5]3 - $C_{20}$-$C_{22}$ amide-ester of methyl acrylate/maleic anhydride/isobutylene copolymer

TABLE II

| Additive* Concentration, % by wt. | Pour Point (ASTM D-97) °F. | Pour Point Depression, °F. |
|---|---|---|
| 0 | 90 | — |
| 0.025 | 70 | 20 |
| 0.05 | 50 | 40 |
| 0.1 | 40 | 50 |
| 0.2 | 40 | 50 |

*$C_{14}$–$C_{22}$ amide ester of ethylene/acrylic acid copolymer(80/20, by wt.) in a No. 6 residual fuel oil.

The polymeric esters of this invention differ from the previous additives in that an amide group is present in the alkyl chain, resulting in significantly enhanced activity in pour point depression, thus allowing the use of lower concentrations of the additive. In addition, the chain length in the alkyl portion is much less critical in these amide-esters than in the simple alkyl esters of the prior art. Thus, it is feasible to use lower alkyl chains in this invention with the activities of the resulting amide-esters being comparable to those with longer chain length. This makes possible the economically advantageous use of wide-range mixtures of fatty acids from natural sources in the preparation of the amide-esters. Furthermore, test results in typical No. 6 residual fuel oils demonstrate greater activity for the additives prepared from such wide-range mixtures. In Table III are shown test results for various esters prepared from an ethylene/acrylic acid copolymer, including simple alkyl esters as well as the amide-esters of this invention. The enhanced activity of the amide-esters is clearly evident.

The polymeric amide-esters of this invention may be prepared in any of various ways, including direct esterification of an acid- or anhydride-containing copolymer with an amide-alcohol. For those additives for which this procedure may be the method of choice, an added advantage occurs in preparation of the amide-containing ester polymer of this invention. Direct esterification of acid or anhydride groups directly attached to a polymer backbone is notoriously difficult to achieve using simple aliphatic alcohols because of steric hindrance around the polymer chain. β-Hydroxyethylamides, on the other hand, react with acid groups by a different mechanism than that of the simple alcohols, one which is not significantly affected by the steric hindrance of the polymer backbone and adjacent groups. Thus, in directly esterifying acid-containing polymers with the amide-alcohols of this invention, essentially complete esterification is readily achieved in a rapid reaction. Furthermore, no esterification catalyst is required; thus, the additional step normally required for catalyst removal is eliminated.

TABLE III

Pour Points of Various Esters of Ethylene/Acrylic Acid (80/20) Copolymers

| Additive | Pour Points, °F. (ASTM D-97) Residual Oils (No. 6) % | a | b | c |
|---|---|---|---|---|
| None | 0 | 90 | 80 | 90 |
| Ester of Ethylene/Acrylic Acid Copolymer (20% AA*): | | | | |
| n-Hexyl | 0.2 | 80 | 80 | 85 |
| Cetyl-eicosyl | 0.2 | 85 | 75 | 85 |
| Behenyl | 0.2 | 85 | 75 | 75 |
| $C_{18}$–$C_{22}$ Amide-ester | 0.2 | 45 | 45 | 70 |
| $C_{14}$–$C_{22}$ Amide-ester | 0.1 | 40 | 40 | 45 |

*AA = Acrylic Acid

In the examples and throughout the specification and claims, all parts and percentages are by weight unless otherwise stated.

EXAMPLE 1

Preparation of an N-methyl-N(2-hydroxyethyl)-amide of a Fatty Acid

The fatty acid used was a commercial mixture comprising $C_{16}$–$C_{22}$ fatty acids with Acid No. 196.5, corresponding to an average molecular weight of 285.

The fatty acid (142.5 g., 0.5 mole) and N-methylaminoethanol (75 g., 1.0 mole) were combined and heated to reflux for 3 hours under nitrogen with intermittent removal of sufficient distillate, mostly water, to maintain the batch temperature at 170°–175° C. The pressure was then gradually reduced to remove excess, unreacted amino alcohol by distillation, leaving the amide-alcohol product as a vacuum stripped residue which solidified on cooling to room temperature.

EXAMPLE 2

Esterification of an Acid-Containing Polymer with the N-methyl-N(2-hydroxyethyl)-amide of a Fatty Acid The polymer used was an ethylene/acrylic acid copolymer containing 20% acrylic acid.

Ethylene/acrylic acid copolymer (36 g., 0.10 mole acid), amide-alcohol (prepared as described above; 36 g., 0.105 mole) and xylene (30 g.) were combined and refluxed under nitrogen 3 hours with continuous removal of the water of esterification, about 1.8 g., by means of a water separator. The reaction mixture was then adjusted to obtain a 50% solution of the amide-ester polymeric product by addition of 41 g. xylene. The solution solidified on cooling to room temperature.

EXAMPLE 3 a. A $C_{12}$–$C_{22}$ fatty acid methyl ester (77.0 g., 0.25 mole) and N-methylaminoethanol (37.5 g., 0.5 mole) were combined and heated under nitrogen 4 hours with the batch temperature gradually raised from 150° to 175° C. Methanol distilled out during this period. Excess, unreacted amino alcohol was then removed by distillation under reduced pressure, leaving the amide-alcohol product as a stripped residue, solid at room temperature.

| | | Calculated | Found |
|---|---|---|---|
| Analysis: | % N | 3.6 | 3.8 |

b. In like manner, other amide-alcohols were prepared by reactions of N-methylaminoethanol with the methyl esters of palmitic and stearic acids.

EXAMPLE 4 a. A $C_{14}$–$C_{22}$ fatty acid mixture (Acid No. 192, equiv. wt. 292; 1460 g., 5.0 moles) and N-methylaminoethanol (750 g., 10.0 moles) were combined and heated at reflux 4 hours under nitrogen. Distillate, mostly water, was removed intermittently through a fractional distillation column in order to maintain the batch temperature within the range of 160°–175° C. The pressure was then gradually reduced to remove excess, unreacted amino alcohol by straight-lead distillation, leaving the amide-alcohol product as a molten, stripped residue, which solidified on cooling.

| | | Calculated | Found |
|---|---|---|---|
| Analysis: | % Total N | 4.02 | 4.36 |
| | % Basic N | 0.00 | 0.02 |
| | Hydroxyl No. | 160. | 150. |

b. In like manner, other amide-alcohols were prepared by reactions of N-methylaminoethanol with a $C_{18}$–$C_{22}$ fatty acid mixture and with oleic acid. Likewise, an amide-alcohol was prepared in similar manner by reaction of ethanolamine and a $C_{18}$–$C_{22}$ fatty acid mixture.

EXAMPLE 5

An ethylene/acrylic acid copolymer (molecular) weight, $M_n$, 10,000) containing 20% acrylic acid (36.0 g., 0.1 equiv. of acid) and 36.0 g. (0.1 mole) of an amide-alcohol (95% purity), prepared from a $C_{14}$–$C_{22}$ fatty acid mixture and N-methylaminoethanol, were combined with 35 ml. of xylene. The batch was heated to reflux under nitrogen 3 hours with a pot temperature of 155°–160° C., while continuously removing water of esterification with a water separator; 1.7 g. of water was obtained (calculated 1.8 /g.). The reaction mixture was further diluted with xylene to a total weight of 137 g., thus yielding the amide-ester product as a 50% solution in xylene, which solidifed on cooling. Acid No. [11.687] *11.6; 87%* esterification.

EXAMPLE 6

Ethylene/acrylic acid copolymer (molecular weight, $\overline{M}_n$, 7500) containing 21% acrylic acid (34.3 g., 0.10 equiv. of acid) was combined with 47.5 g. (0.12 mole) of an amide-alcohol prepared by reaction of a $C_{18}$–$C_{22}$ fatty acid and N-methylaminoethanol. Sufficient xylene, about 25 ml., was added to obtain a pot temperature of 160°–165° C. at reflux. Water of esterification was removed over a period of 3 hours, using a Dean-Stark trap; the amount of water obtained was slightly less than the theoretical. The reaction mixture was taken up in 200 ml. chloroform, and the amide-ester product was precipitated by pouring the solution into a large volume of methanol. After filtration and vacuum drying, the white solid product weighed 70.9 g. (98.5% yield). Acid No. 1.28; of 98.5% esterification.

| | | Calculated | Found |
|---|---|---|---|
| Analysis | % N | 1.94 | 1.96 |

EXAMPLE 7 a. The following materials were combined and heated 2.5 hours at reflux (pot temperature, 170° C.): 112.5 g. (0.030 equiv. of acid) oxidized polyethylene with Acid No. 15, 12.1 g. (0.033 mole) of the amide-alcohol (93% purity) prepared by reaction of a $C_{18}$–$C_{22}$ fatty acid mixture with N-methylaminoethanol, and 65 ml. of xylene. Water of esterification was removed continuously by means of a water separator. The reaction mixture was diluted with additional xylene (58 g.) to adjust the final product to 50% solids in xylene. Acid No. 2.3; 81% esterification.

b. In like manner, a similar product was obtained using the amide-alcohol prepared from a $C_{14}$–$C_{22}$ fatty acid mixture.

EXAMPLE 8 a. N-methylpalmitamidoethanol (31.3 g., 0.10 mole) was combined with 34.3 g. (0.10 equiv.) of an ethylene/acrylic acid copolymer containing 21% acrylic acid. Xylene (60 ml.) was added, and the mixture was heated at reflux under nitrogen 3 hours with continuous removal of water of esterification. A further addition of xylene was made to adjust the final mixture to 50% solids. Acid No. 11.2; 88% esterification.

b. Under conditions similar to those above, the N-methylstearamidoethyl ester was prepared. The final product was isolated by taking up the reaction mixture in chloroform, followed by precipitation of the solid amide-ester in a large volume of methanol.

EXAMPLE 9

N-methyl-oleamidoethanol (17.7 g., 0.05 mole), prepared by reaction of oleic acid with N-methylaminoethanol, was combined with 17.2 g. (0.05 equiv.) of an ethylene/acrylic acid copolymer containing 20% acrylic acid. Xylene (21 ml.) was added as an azeotroping agent, and the mixture was refluxed 4 hours under nitrogen with removal of water of esterification through a Dean-Stark trap; most of the water, about 0.9 g. total, came over during the first hour. The final product was adjusted to a 50% solids content by addition of 15 g. xylene to the reaction mixture. Acid No. 8.7; 81% esterification.

EXAMPLE 10

The simple ester products described below in this Example 10a and 10b do not fall within the scope of this invention but were prepared for direct comparison with the amide-esters of this invention.

a. The following materials were combined and heated at reflux 5 hours under nitrogen: 34.4 g. (0.10 equiv.) ethylene/acrylic acid copolymer containing 21% acrylic acid, 35.0 g. (0.115 mole) behenyl alcohol, 1.0 g. (0.005 mole) p-toluenesulfonic acid monohydrate and 50 ml. xylene. Water of esterification was removed continuously by means of a Dean-Stark trap; 1.5 g. of water was obtained (calculated, 1.8 g.). The viscous reaction mixture was taken up in 200 ml. chloroform, and the resulting solution was poured into a large volume (1,500 ml.) of methanol with vigorous agitation to obtain the ester product as a finely divided precipitate. After filtration and drying, the yield of white solid product was 62.2 g. Acid No. 19.8; 80% esterification.

b. n-Hexyl and cetyl-eicosyl esters of ethylene/acrylic acid copolymers were prepared in like manner.

EXAMPLE 11 a. An amide-ester of an ethylene/acrylic acid copolymer (2.4% acrylic acid) was prepared as described in Example 5, using the amide-alcohol obtained by reaction of a $C_{18}$–$C_{22}$ fatty acid mixture with N-methylaminoethanol. The product was isolated as a 50% solution in xylene, solid at room temperature. Acid No. 2.8; 68% esterification.

b. In like manner, an amide-ester was prepared using the same copolymer as above but with the amide derived from a $C_{14}C_{22}$ fatty acid mixture and N-methylaminoethanol.

EXAMPLE 12

An amide-ester of an ethylene/acrylic acid copolymer (molecular weight, $\overline{M}_n$, 4000; 5.1% acrylic acid)

was prepared as described in Example 5, using the amide-alcohol obtained from a $C_{14}$–$C_{22}$ fatty acid mixture and N-methylaminoethanol. The reaction mixture was further diluted with xylene to give a final product at 50% solids. Acid No. 4.9; 85% esterification.

EXAMPLE 13 a. The amide-ester of an ethylene/acrylic acid/vinyl acetate terpolymer (5.1% acrylic acid, 2% vinyl acetate) was prepared under the esterification conditions described in Example 5. The amide-alcohol was obtained by reaction of a $C_{18}$–$C_{22}$ fatty acid mixture with N-methylaminoethanol. The product was isolated at 50% solids in xylene. Acid No. 1.6; 90% esterification.

b. In like manner, the corresponding amide-ester was prepared using an ethylene/acrylic acid/vinyl acetate terpolymer (87.4/9.6/3 % by weight).

EXAMPLE 14

An oxidized polyethylene with Acid No. 15 (112.5 g., 0.03 equiv. of acid) was esterified using 13.4 g. (0.033 mole) of an amide-alcohol (93% purity) obtained from reaction of a $C_{14}$–$C_{22}$ fatty mixture with ethanolamine. Using xylene as the azeotroping agent, water of esterification was removed during a 2.5 hour reflux period with a pot temperature of 170° C. Additional xylene was then introduced to adjust the solids content of the final product to 50%. The solution solidifed on cooling. Acid No. 2.8; 60% esterification.

[EXAMPLE 15]

[The following materials were combined and heated at reflux (pot temperature, 150° C.) 3 hours under nitrogen: 27.0 g. (0.015 equiv. of acid) of a cetyl-eicosyl acrylate/acrylic acid oligomer (molecular weight, $\overline{M}_n$, 2000; 10% acrylic acid; 40% solution in xylene) and 6.0 g. (0.015 mole) of the amide-alcohol obtained by reaction of a $C_{18}$–$C_{22}$ fatty acid mixture with N-methylaminoethanol. Water of esterification was removed by the refluxing xylene and collected in a Dean-Stark trap. The final product was isolated as a 50% solution in xylene.]

[EXAMPLE 16]

[a. The amide-ester of a cetyl-eicosyl acrylate/acrylic acid oligomer (60/40, weight; molecular weight, $\overline{M}_n$, 1700) was prepared by direct esterification of 13.5 g. (0.03 equiv. of acid) of the oligomer (40% solution in xylene) with 11.7 g. (0.03 mole) of an amide-alcohol derived from a $C_{18}$–$C_{22}$ fatty acid mixture and N-methylaminoethanol. Water of esterification was removed as an azeotrope with xylene and collected in a Dean-Stark trap; 0.5 g. water was obtained in 3 hours of reflux with the pot temperature at 145°–150° C. The reaction mixture was adjusted by addition of xylene to obtain a final product at 50% solids.]

[b. In like manner, an amide-ester was prepared from a cetyl-eicosyl methacrylate/acrylic acid oligomer (80/20, by weight), using the same amide-alcohol described above.]

EXAMPLE [17] *15*

An amide-ester was prepared by esterification of an octadecene/maleic anhydride copolymer (1:1 mole ratio; molecular weight, $\overline{M}_n$, 1900) with the amide-alcohol derived from a $C_{18}$–$C_{22}$ fatty acid mixture and N-methylaminoethanol. The esterification charge consisted of 29.2 g. (0.05 mole anhydride) of the copolymer (60% in xylene), 46.0 g. (0.11 mole) of the amide-alcohol (93% purity) and 13 g. xylene. The mixture was refluxed under nitrogen 2 hours with a pot temperature of 163°–165° C. and 1 hour with a pot temperature of 180° C. (after removal of sufficient xylene by distillation). About 0.8 g. water of esterification was collected in a Dean-Stark trap. Sufficient xylene was then returned to the reaction mixture to adjust the final product to a solids content of 50%.

EXAMPLE [18] *16*

An octadecene/maleic anhydride copolymer (1:1 mole ratio; molecular weight, $\overline{M}_n$, 1900) was esterified with a mixture of Alfol 20+ alcohol (mostly $C_{20}$–$C_{24}$ alcohols, containing about 30% inert materials) and an amide-alcohol obtained by reaction of a $C_{18}$–$C_{22}$ fatty acid mixture with N-methylaminoethanol. The esterification charge comprised 29.2 g. (0.05 mole anhydride) of the copolymer (60% in xylene), 22.9 g. (0.05 mole) Alfol 20+ alcohol, 20.0 g. (0.055 mole) of the amide-alcohol, 0.25 g. p-toluenesulfonic acid monohydrate and 4.5 g. xylene. The mixture was heated at reflux 3 hours under nitrogen with a pot temperature of 180° C. Water of esterification (0.8 g.) was collected in a Dean-Stark trap. The reaction mixture was adjusted by addition of xylene to give a final product at 50% solids.

EXAMPLE [19] *17*

A methyl acrylate/maleic anhydride/isobutylene terpolymer (59/26/15 % by weight; molecular weight, $\overline{M}_n$, 50,000) was esterified with the amide-alcohol obtained by reaction of a $C_{18}$–$C_{22}$ fatty acid mixture with N-methylaminoethanol. The esterification charge comprised 3.0 g. (0.008 mole anhydride) of the terpolymer, 6.5 g. (0.016 mole) of the amide-alcohol (95% purity) and 9.0 g. xylene. The mixture was heated at reflux 3 hours under nitrogen while collecting 0.12 g. water in a Dean-Stark trap. The product, 50% in xylene, was a rubbery solid on cooling.

As noted above, the fatty acid mixture used throughout this specification, claims or application to make the amide-alcohol may have a carbon atom content over a wide range. The range will ordinarily vary from about a $C_{12}$ to about a $C_{30}$ fatty acid mixture and, more preferably, from about a $C_{14}$ to about a $C_{22}$ fatty acid mixture.

We claim:

1. An improved hydrocarbon oil having a lower pour point and improved flow characteristics comprising (a) a major amount of the oil and (b) a minor amount in the range of about 0.005% to about 1.0% of a composition comprising an N-acylaminoethyl ester of a carboxylic acid-containing polymer having the general formula:

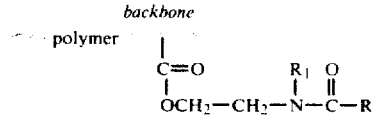

where R is an alkyl or alkene group having about 11 to 29 carbon atoms, [and]0 where $R_1$ is H or an alkyl group having 1 to 4 carbon atoms, *and where the polymer backbone is derived from an olefin substituted or unsubstituted or from a copolymer of an olefin substituted or unsubstituted and at least one of an acid, an acid anhydride, and an ester.*

2. Composition according to claim 1 wherein the oil is selected from the group consisting of crude oils, middle distillate fuels and residual fuels, and wherein (b) is present in an amount of about 0.005% to about 1.0% by weight.

3. Composition according to claim 2 wherein (b) is a $C_{12}$–$C_{30}$ amide-ester of an ethylene/acrylic acid copolymer, said copolymer having a molecular weight in the range of about 500 to 100,000.

4. Composition according to claim 2 wherein (b) is a $C_{14}$–$C_{22}$ amide-ester of an ethylene/acrylic acid copolymer, said copolymer having a molecular weight in the range of about 500 to 100,000.

5. Composition according to claim 2 wherein (b) is a $C_{12}$–$C_{30}$ amide-ester of [cetyl-eicosyl acrylate/acrylic acid copolymer, said copolymer] *oxidized polyethylene, said polyethylene* having a molecular weight in the range of about 500 to 100,000.

6. Composition according to claim 2 wherein (b) is a $C_{12}$–$C_{30}$ amide-ester of [cetyl-eicosyl methacrylate/acrylic acid] *octadecene/maleic anhydride* copolymer, said copolymer having a molecular weight in the range of about 500 to 100,000.

7. Composition according to claim 2 wherein (b) is a $C_{12}$–$C_{30}$ amide-ester of methyl acrylate/maleic anhydride/isobutylene copolymer, said copolymer having a molecular weight in the range of about 500 to about 100,000.

8. Composition according to claim 2 wherein (b) is a $C_{12}$–$C_{30}$ amide-ester of ethylene/acrylic acid/vinyl acetate terpolymer, said terpolymer having a molecular weight in the range of about 500 to about 100,000.

* * * * *

UNITED STATES PATENT AND TRADEMARK OFFICE

CERTIFICATE OF CORRECTION

PATENT NO. : RE 30,238

DATED : March 25, 1980

INVENTOR(S) : Edward A. Specht and James H. O'Mare

It is certified that error appears in the above—identified patent and that said Letters Patent is hereby corrected as shown below:

Col. 1, l. 20 ), __ defined to read -- is defined --

Col. 2, l. 22

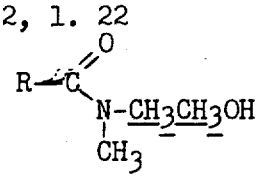

to read --

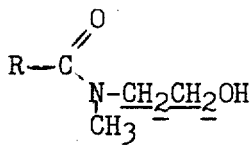

--

Col. 2, l. 37 $CH_3NHCH_3CH_3OH$ to read -- $CH_3NHCH_2CH_2OH$ --

Col. 2, l. 42 $N\text{-}CH_3CH_3OH$ ($CH_3$) to read -- $N\text{-}CH_2CH_2OH$ ($CH_3$) --

UNITED STATES PATENT AND TRADEMARK OFFICE

CERTIFICATE OF CORRECTION

PATENT NO. : RE 30,238

DATED : March 25, 1980

INVENTOR(S) : Edward A. Specht and James H. O'Mare

It is certified that error appears in the above—identified patent and that said Letters Patent is hereby corrected as shown below:

Col. 3, l. 53 ~ polymer $\underset{COOCH_2}{\sim}$ to read -- ~ polymer $\underset{COOCH_3}{\sim}$ --

Col. 4, l. 50 A 0.17 70 110 to read -- A 0.17 70 45 --

Col 4, l. 57 20.1 65 45 65 55 70 to read -- 20.1 65 45 60 70 65 70--

Col. 4, l. 60 'A-$C_{12}$ ester to read -- 'A-$C_{22}$ ester --

Col. 9, l. 23 $C_{14}$-$C_{22}$ fatty mixture to read -- $C_{14}$-$C_{22}$ fatty acid mixture --

Col. 10, l. 61 [and] 0 to read -- [and] --

Signed and Sealed this

*Eighth* Day of *May 1984*

[SEAL]

*Attest:*

GERALD J. MOSSINGHOFF

*Attesting Officer* *Commissioner of Patents and Trademarks*